Oct. 21, 1952 — G. C. WYMAN — 2,614,722
PRESSURE COOKER WITH AUTOMATIC VENT
Filed May 4, 1948 — 2 SHEETS—SHEET 1

Inventor:
Glenn C. Wyman
by Emery Booth Townsend Miller & Weidner
Attys

Oct. 21, 1952 — G. C. WYMAN — 2,614,722
PRESSURE COOKER WITH AUTOMATIC VENT
Filed May 4, 1948 — 2 SHEETS—SHEET 2
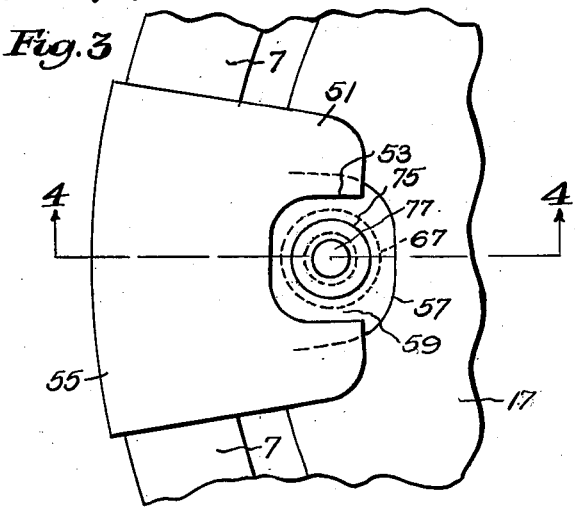
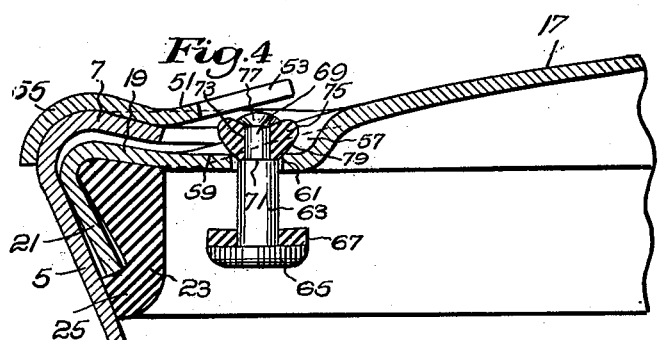
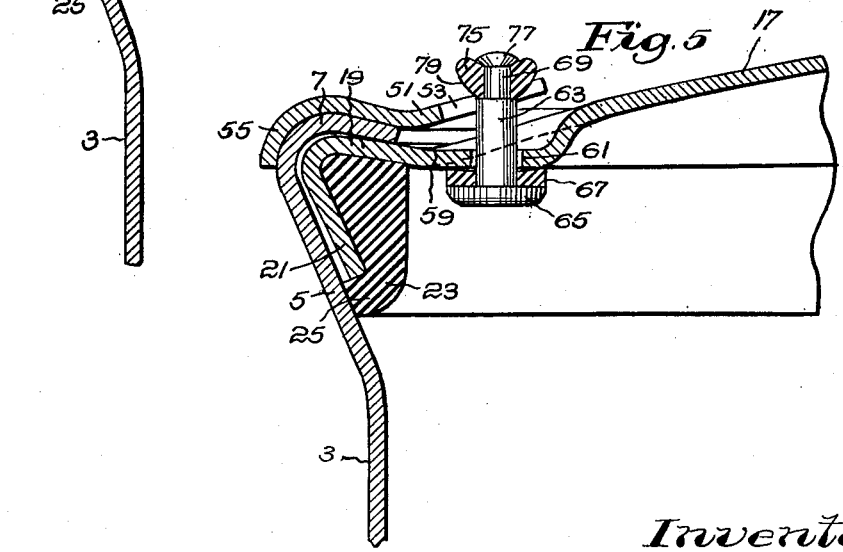
Inventor:
Glenn C. Wyman Patented Oct. 21, 1952

2,614,722

UNITED STATES PATENT OFFICE 2,614,722

PRESSURE COOKER WITH AUTOMATIC VENT

Glenn C. Wyman, Rome, N. Y., assignor to Revere Copper and Brass Incorporated, Rome, N. Y., a corporation of Maryland Application May 4, 1948, Serial No. 25,000

3 Claims. (Cl. 220—40)

My invention relates to pressure cookers.

The invention has among its objects a pressure cooker provided with a lock responsive to fluid pressure within the cooker for preventing opening of the cover while the cooker is under pressure, thereby enforcing venting of the cooker by the operator before the cover can be opened. Also among the objects of the invention is the provision of a signaling device for a pressure cooker.

The above and other objects of the invention will, however, be best understood from the following description when read in the light of the accompanying drawings of a specific embodiment of the invention selected for illustrative purposes, while the scope of the invention will be more particularly pointed out in the appended claims.

In the drawings:

Fig. 3 shows a detail of Fig. 1, on an enlarged scale;

Fig. 4 is a section on the line 4—4 of Fig. 3, this section line being also applied to Fig. 1 for convenience in following the drawings; and Fig. 5 is a section corresponding to Fig. 4, with the parts in a different operative position.

Figure 1:
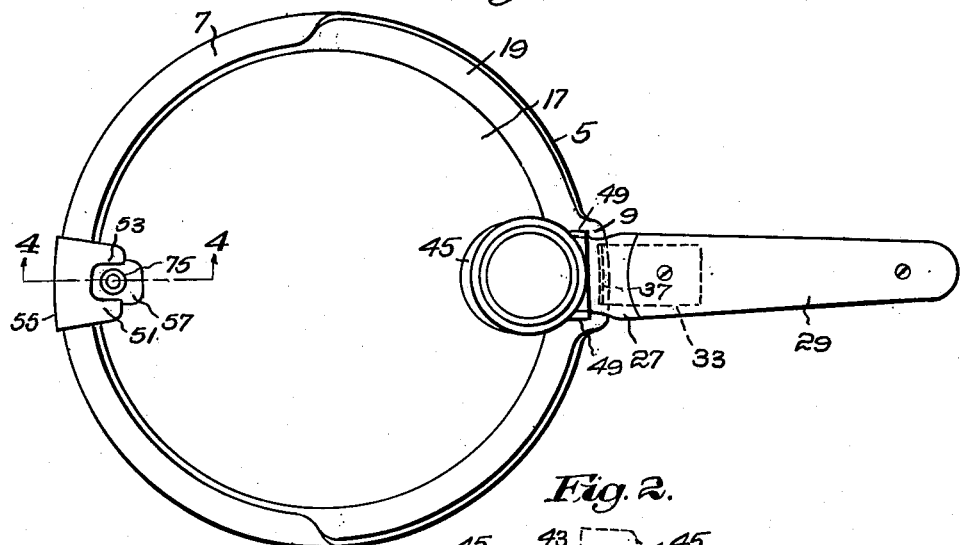
Fig. 1 is a plan of a pressure cooker according to the invention.

Referring to the drawings, the pressure cooker illustrated comprises a container, preferably formed of sheet metal such as stainless steel, having a bottom 1 and cylindrical side walls 3. Adjacent their upper edges the side walls are formed to present an upwardly and outwardly flared frusto-conical portion 5 extending entirely about said walls. At its upper edge this frusto-conical portion is shown as formed to present an inwardly turned lip 7 extending about said portion for approximately 180°. At the side of the frusto-conical portion diametrically opposite the mid portion of the lip 7 the upper edge of the frusto-conical portion is formed with an outwardly projecting downturned lip 9 of much shorter angular extent than the lip 7. Carried by the container is a radially projecting handle 11 having a base portion 13 secured to the cylindrical wall of the container below the lip 9, preferably by welding, this handle being provided with the handle grips 15.

As further illustrated, the cover, which also is preferably formed of sheet metal such as stainless steel, is shaped to present a dome-like central portion 17 surrounded by a flattened relatively narrow annular flange 19. Integral with the outer peripheral edge of this flange is an inwardly and downwardly turned frusto-conical flange 21 extending entirely about the cover. Carried by the cover at its under side is a gasket ring 23 of greater height than the flange 21, this ring being formed of flexible material such as synthetic rubber, shaped to fit into the space between the flanges 19 and 21 and to provide a lower portion 25 which projects radially beyond the outer side of the flange 21 at its lower edge so as to bear uninterruptedly against the inner wall of the frusto-conical portion 5 of the container when the cover is assembled with the latter.

As shown, the cover is provided with a radially projecting handle 27 provided with the handle grips 29. This handle is provided with a base portion 31 which conforms to the upper sides of the dome-shaped portion 17 and annular flange 19 of the cover, to both of which such base portion is secured preferably by welding. Secured to the under side of the handle 27, preferably by welding, is the base 33 of a strip-like metallic member which, at its end adjacent the cover, is provided with a downturned portion 35, which latter, at its lower end, is upwardly turned to present a hook 37.

The cover is applied to the container for securing it thereto with the handle 27 of the cover out of vertical alignment with the handle 11 of the container and with the handle 27 inclined slightly upward to such a degree that the edge portion of the cover opposite its handle may be inserted under the lip 7 of the container. The handle 27 may then be lowered to cause the radially outwardly projecting portion 25 of the gasket ring to seat on the frusto-conical portion 5 of the container throughout the angular extent of such ring, whereupon the handle 27 may be swung to bring it into vertical alignment with the handle 11 of the container for placing the hook 37 of the cover handle under the lip 9 of the container. When the cover is initially placed on the container a clearance exists between the container lip 7 and the cover flange 19, as clearly shown by Fig. 4, and a clearance between the container lip 9 and cover hook 37, as clearly shown by Fig. 2, these clearances being equal. Under these conditions the radially outwardly projecting portion 25 of the gasket ring 23 bears against the frusto-conical container portion 5 so as to seal the joint between the cover and container and thus permit pressure to build up in the cooker. When the pressure builds up the cover rises so as to take up the just mentioned clearances, as indicated in Fig. 5, the gasket ring due to its resiliency and the pressure in the cooker remaining in contact with the frusto-conical container portion 5 so that at all times the gasket renders the joint between the cover and the container steam-tight.

As shown, the base portion 31 of the cover handle and portions of the cover immediately below it are perforated for receiving a flanged plug 39, preferably formed of yieldable material such as rubber, sprung into such perforation. This plug is formed with a through passage serving as a vent opening 41 for the cooker. Cooperating with the upper end portion of the vent opening is shown a frusto-conical valve 43 carried at the under side of a weight 45, the latter being pivotally secured at 47 to upstanding ears 49 formed at opposite sides of the cover handle 27. With the parts as shown in their full line position in Fig. 2 the swinging weight 45 and valve 43 will control the vent opening 41 to prevent a predetermined maximum pressure in the cooker being exceeded. When the weight is swung to its dotted line position shown by Fig. 2 the vent opening will be maintained in open condition.

Diametrically opposite its handle 11 the container lip 7 is shown as carrying a member presenting on said lip an inwardly extending projection or lip 51 of short angular extent, the inner edge of which projection is provided with a notch 53. As shown, this member, which is preferably formed of sheet metal such as stainless steel, is formed with a base portion 55 shaped to conform to the upper surface of the lip 7, to which latter it is secured preferably by welding.

Diametrically opposite its handle 27 the cover adjacent its annular flange 19 thereof is formed with a depressed portion 57 having a flat bottom 59. This bottom is formed with a perforation 61 which is in vertical alignment with the notch 53 of the projection or lip 51 when the two handles 11 and 27 are in vertical alignment. Loosely and reciprocably extending through this perforation is a metal locking pin 63 the lower end of which is shown as integrally formed with a head 65 of larger diameter than the perforation. On its upper side the head carries an annular gasket washer 67 of yieldable material such as synthetic rubber. The upper end of the pin, which projects through the vent opening 61, is shown as formed with a reduced diameter portion 69 providing an upwardly facing annular shoulder 71 on the pin. This reduced diameter portion 69 projects through the central perforation 73 of a metal head 75, which latter also is of larger diameter than the perforation 61, the upper end of the reduced diameter portion being riveted over, as indicated at 77, for securing the head 75 to the pin and thus securing the latter in assembled relation with the cover.

Figure 2:
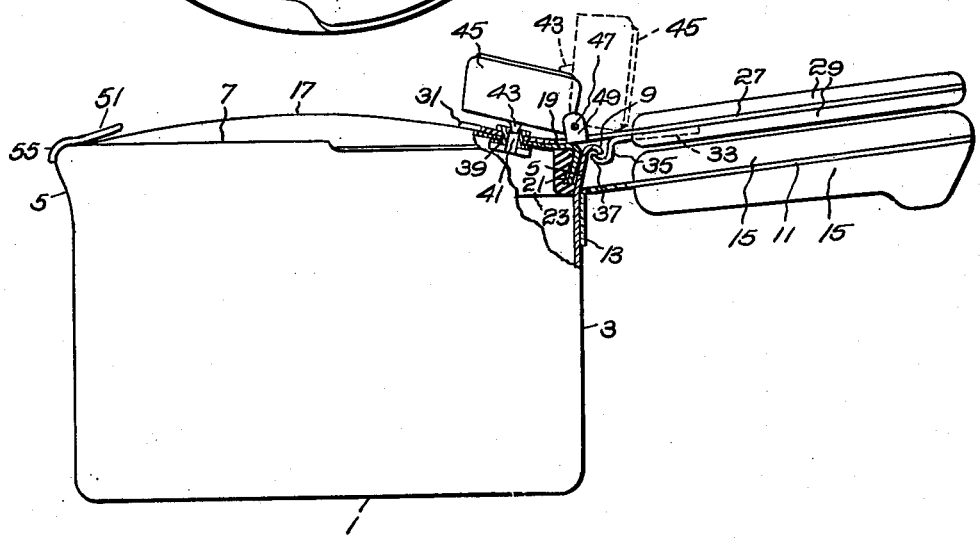
Fig. 2 is an elevation of a pressure cooker according to Fig. 1, with parts broken away.

When the cover is in place, and the cooker is vented by moving the valve weight 45 to its dotted line position shown by Fig. 2, the locking pin 63 will be maintained by gravity in its position shown by Fig. 4. However, when the vent opening is closed, to cause pressure to build up in the cooker, such pressure will raise the pin to its position, shown by Fig. 5, firmly to seat the gasket washer 67 against the portions of the under side of the cover surrounding the perforation 61 so as to prevent escape of pressure fluid through such perforation. When the pin is so raised it will project into the notch 53 of the projection or lip 51, and thus will prevent the cover being rotated relative to the container for disengaging the above described means for securing the cover to the container until the cover vent is opened for relieving the pressure in the cooker to cause the pin to drop to its position shown by Fig. 4. Preferably, the lateral sides of the head 75 are tapered downward, as indicated at 79, so that the steam escaping through the perforation 61 when the pin begins to lift will, by acting on such tapered sides, rapidly lift the pin from its position shown by Fig. 4 to that shown by Fig. 5, and thus reduce to a minimum the escape of pressure fluid from the cooker while the pin is being lifted.

It will also be observed that the pin 63, which rises when the water in the cooker is at approximately boiling point, also serves as an indicator for showing when the cooker is under pressure and when it is not under pressure. By observing the position of the pin, the head 75 of which is mostly concealed by the walls of the recess 57 and the projection or lip 51 when the cooker is not under pressure and is clearly visible when the cooker is under pressure, the operator will have an indication of when it is safe to release the cover.

In fact, the member forming the lip 51 may be entirely omitted when it is desired to omit the feature of locking the cover against rotation, in which case the pin will still serve as an indicator. In such case when the cooker is under pressure and it is desired to remove the cover the operator by use of a suitable instrument, such as a spoon or knife, may press the pin inward and hold it in such position to cause the valve constituted by the washer 67 to open the vent passage afforded by the perforation 61, and as soon as the operator observes that the pin ceases to exert an upward pressure on such instrument and will remain in its lower position when the instrument is removed the operator will know that the cooker is not under pressure and that the cover may be safely released. Also, by visually observing that the pin has dropped when the cooker is vented by opening the weight valve, the operator will know when it is safe to open the cover.

It will be understood that within the scope of the appended claims wide deviations may be made from the form of the invention described without departing from the spirit of the invention.

I claim:

1. A pressure cooker comprising a container, a cover for the latter, means for securing the cover to the container in closed relation thereto operated into engaged and released positions by rotation of the cover relative to the container, packing means for sealing against escape of pressure fluid from the cooker the joint between the cover and container when the cover is so secured, means for locking the cover against such rotation when the cooker is under pressure comprising a part carried by the container in overlying relation to the upper side of an edge portion of the cover when the cover is so secured to the container, said edge portion of the cover having an opening, a locking pin member received in said opening for vertical reciprocation from a lower position, in which position such overlying part is out of the path of said member when the cover is rotated, to an upper position in which said part is in such path to act as a stop for preventing rotation of the cover to its position which releases the first mentioned means; said member having a portion below the cover adapted to be exposed to pressure fluid within the cooker for moving said member to and maintaining it in its said upper position when the cooker is under pressure, spaced shoulders carried by the pin above and below the cover for maintaining said pin against removal from the cover, the cover having a vent opening normally constituting the sole means of escape of pressure fluid from the cooker when the cover is secured thereto, a safety valve for said vent opening operative to maintain a predetermined pressure within the cooker, which valve is manually movable to open position for relieving the pressure within the cooker for causing said member to move from its said upper position to its said lower position.

2. A pressure cooker according to claim 1 in which the reciprocatory member received in the opening in the cover is in the form of a pin having, at the upper and under sides of the cover, shoulder portions for retaining it in said opening, the shoulder portion at the under side of the cover being adapted to seat thereon for preventing escape of pressure fluid from the cooker through said opening when the pin is moved to its upper position by such pressure fluid, the pin being movable by gravity from its upper to its lower position when the pressure within the cooker is relieved by the manual opening of the safety valve.

3. A pressure cooker according to claim 1 in which the part carried by the container in overlying relation to the edge portion of the cover operatively has an opening, through which opening the reciprocatory member received in the opening in the cover extends to above the upper side of said part when said member is in its upper position, said member being withdrawn from said opening to lie wholly below said part when said member is in its lower position, whereby said member serves as an indicator for the pressure condition within the cooker, said member having shoulder portions at the upper and under sides of the cover for retaining said member in said opening in the cover, the shoulder portion at the under side of the cover being adapted to seat on the cover for preventing escape of pressure fluid through said opening in the cover when said member is moved to its upper position by such pressure fluid.

GLENN C. WYMAN.

REFERENCES CITED

The following references are of record in the file of this patent:

UNITED STATES PATENTS

| Number | Name | Date |
| --- | --- | --- |
| 1,326,124 | Vischer | Dec. 23, 1919 |
| 1,361,946 | Whittaker | Dec. 14, 1920 |
| 1,418,530 | Burnham | June 6, 1922 |
| 1,706,051 | Auchincloss | Mar. 19, 1929 |
| 1,821,726 | Saporta | Sept. 1, 1931 |
| 2,200,903 | Stephens | May 14, 1940 |

FOREIGN PATENTS

| Number | Country | Date |
| --- | --- | --- |
| 12,969 | Austria | Aug. 10, 1903 |